US011687753B2

(12) United States Patent
Druffel et al.

(10) Patent No.: US 11,687,753 B2
(45) Date of Patent: Jun. 27, 2023

(54) FREQUENCY SELECTIVE SURFACES FOR TRACKING, LABELING AND IDENTIFICATION

(71) Applicant: UNIVERSITY OF LOUISVILLE, Louisville, KY (US)

(72) Inventors: Thad Druffel, Louisville, KY (US); Brandon Young, Louisville, KY (US)

(73) Assignee: University of Louisville, Louisville, KY (US)

( * ) Notice: Subject to any disclaimer, the term of this patent is extended or adjusted under 35 U.S.C. 154(b) by 35 days.

(21) Appl. No.: 16/980,148

(22) PCT Filed: Mar. 12, 2019

(86) PCT No.: PCT/US2019/021811
§ 371 (c)(1),
(2) Date: Sep. 11, 2020

(87) PCT Pub. No.: WO2019/178068
PCT Pub. Date: Sep. 19, 2019

(65) Prior Publication Data
US 2021/0012171 A1 Jan. 14, 2021

Related U.S. Application Data

(60) Provisional application No. 62/642,059, filed on Mar. 13, 2018.

(51) Int. Cl.
*G06K 19/067* (2006.01)
(52) U.S. Cl.
CPC .............................. *G06K 19/0672* (2013.01)

(58) Field of Classification Search
None
See application file for complete search history.

(56) References Cited

U.S. PATENT DOCUMENTS 5,767,789 A * 6/1998 Afzali-Ardakani ............ H01Q 15/0013
340/572.1
7,884,718 B2 * 2/2011 Knadle, Jr. ......... G06K 17/0029
340/10.2

(Continued)

FOREIGN PATENT DOCUMENTS

EP 3 104 307 A1 12/2016
JP 2004198139 A * 7/2004

*Primary Examiner* — Muhammad Adnan
(74) *Attorney, Agent, or Firm* — WC&F IP

(57) ABSTRACT

Embodiments of the invention employ frequency selective surfaces that resonate at defined frequencies depending on geometry. Tag-based embodiments allow the ability to have passive, battery-free, systems that can be used for applications including but not limited to inventory tracking, locating, and indoor radar (e.g. determining whether something labeled with a tag is in range of a particular wireless network signal). The shape of the resonator, among other available factors, influences the interference frequency. Embodiments may include metal based tags on a non-conductive material that will be used to disturb, for example, frequencies from 3 KHz to 300 GHz. These disturbances at specific resonant frequencies are useable to, for example, locate the tags/labels using WiFi Mapping, sending a WiFi signal and getting unique feedback on a router.

1 Claim, 13 Drawing Sheets

(56) References Cited

U.S. PATENT DOCUMENTS

| | | | | |
|---|---|---|---|---|
| 8,417,751 | B1* | 4/2013 | Yagnik | G06V 10/751 |
| | | | | 708/420 |
| 9,279,845 | B2* | 3/2016 | Armbrecht | G01R 29/105 |
| 9,818,053 | B2* | 11/2017 | Alsafadi | G06K 19/0672 |
| 10,133,894 | B2* | 11/2018 | Kruest | G06K 7/10029 |
| 10,552,651 | B1* | 2/2020 | Fink | G06K 7/10356 |
| 2004/0075560 | A1* | 4/2004 | Hartmann | G08B 13/2417 |
| | | | | 340/572.1 |
| 2005/0007238 | A1 | 1/2005 | Hartmann et al. | |
| 2005/0077353 | A1* | 4/2005 | Oishi | G06K 19/07796 |
| | | | | 235/385 |
| 2008/0129453 | A1* | 6/2008 | Shanks | G06K 7/0008 |
| | | | | 342/350 |
| 2008/0150691 | A1* | 6/2008 | Knadle | G06K 7/0008 |
| | | | | 340/10.1 |
| 2008/0240263 | A1* | 10/2008 | Li | H04L 5/0007 |
| | | | | 375/260 |
| 2009/0167533 | A1* | 7/2009 | Chen | G06K 19/0672 |
| | | | | 340/572.1 |
| 2009/0273527 | A1 | 11/2009 | Behdad | |
| 2009/0289795 | A1* | 11/2009 | Yamagajo | G06K 7/10178 |
| | | | | 340/572.1 |
| 2012/0176225 | A1* | 7/2012 | Forster | G06K 19/0724 |
| | | | | 235/492 |
| 2012/0293307 | A1* | 11/2012 | Djuric | G06K 7/10465 |
| | | | | 340/10.2 |
| 2014/0313090 | A1 | 10/2014 | Oh et al. | |
| 2016/0018508 | A1* | 1/2016 | Chen | G01S 5/0218 |
| | | | | 455/456.1 |
| 2018/0007653 | A1* | 1/2018 | O'Shea | H04W 24/10 |
| 2018/0188831 | A1* | 7/2018 | Lyons | G06F 3/016 |
| 2022/0299628 | A1* | 9/2022 | Chang | A61B 5/0015 |

* cited by examiner

FREQUENCY SELECTIVE SURFACES FOR TRACKING, LABELING AND IDENTIFICATION

CROSS-REFERENCE TO RELATED APPLICATIONS

This application claims the benefit of U.S. Provisional patent application no. 62/642,059 filed Mar. 13, 2018, the complete contents of which are herein incorporated by reference.

FIELD OF THE INVENTION

The invention generally relates to tracking and identifying entities, and in some embodiments tracking in wireless network environments with passive ID tags.

BACKGROUND

In 2017, the US Postal Service and UPS processed and shipped approximately 10 billion packages. The number of packages handled by these two companies has increased by 2 million packages per day in just a one-year period, 2016 to 2017. In just retail alone, $818 Billion is lost each year due to deficiencies in the current inventory solutions with a growing rate of over $50 billion each year. The current solutions to track these are elementary (Barcode) or complex (RFID) and are sub-optimal. Barcode is very simplistic; however, it has serious deficiencies related to the need for direct optical line of sight and susceptibility to tag damage. RFID solves these issues of barcodes; however, RFID comes at a significant cost both in the tags and the associated infrastructure for using the tags. Despite the shortcomings, these anchor a $20B+ yearly market with expected 28% growth by 2020.

Current inventory tag solutions prevent corporations from maximum efficiencies and detailed data. Table 1 summarizes pros and cons of barcodes and radio-frequency identification (RFID) technologies.

TABLE 1

| type of tag | positive | negative |
| --- | --- | --- |
| barcode | cost-effective simplistic to use universal standard | not durable requires line of sight detection is singular susceptible to human error |
| RFID | detection is multiple durable location tracking can be automated | expensive not simplistic to use no standard within bandwidths dense material interference |

The capacity, simplicity, and accuracy desired of tagging systems at a cost-effective rate are not being met by the current solutions. Current solutions are limited in their abilities because of the transmitter and tag interaction of each system. In the case of Barcode, the optical detection requires a simplistic reading of vertical lines with no further functionality available. RFID, on the other hand, is complex. RFID's transmitter and tag interaction use the technology of energy harvesting. Energy harvesting is the powering of an IC through a transmitter at a certain frequency band. The powering of an IC through a transmitter results in interference limitations with an exponentially increased price per tag and module due to the energy transfer required.

Technologies which interact with WiFi signals in a meaningful way without using powered electronics are nascent. "In first, 3-D printed objects connect to WiFi without electronic" by researchers at University of Washington describes plastic 3D-printed devices which reflect or absorb signals from a WiFi router. The signal may be decoded into a binary result to indicate, for example, whether a bottle of household fluid like laundry detergent is empty or is not empty.

US20170086202A1 describes a system for object detection in a wireless network. A wireless communication device detects the presence of an object in the wireless network based at least in part on the first interference profile and the second interference profile. The system may be employed as part of a home alarm system that detects intruders. The system is relatively crude in that it does show viability in uniquely identifying a plurality of different detected objects.

U.S. Pat. No. 7,884,718B2 describes the use of a frequency selective surface (FSS) within a metal radome that shields an RFID reader. This use is consistent with a historical FSS use, namely to filter selective frequencies in assistance of some antenna.

"Design of Active Frequency Selective Surface with Curved Composite Structures and Tunable Frequency Response" Lee et al., International Journal of Antennas and Propagation, Volume 2017, Article ID 6307528, describes an active FSS. Though the FSS are tunable, they have the drawback of requiring power.

There is a considerable need for technologies which capitalize on the uses and benefits of barcodes and RFID tags while avoiding the drawbacks of both respective technologies. There is also much left to be desired in regard to exploitation of existing wireless networks as a means of object detection and tracking.

SUMMARY

According to some embodiments, novel tags are employed which exhibit the low cost and ease of use benefits of barcodes as well as advantages of RFID such as high accuracy, detection through objects, and capacity (i.e. number of unique labels within a single tracking system), all without the respective drawbacks of barcodes and RFID. The novel tags employ frequency selective surfaces (FSS) configured to act as passive antennae. A tracking system which employs the tags may piggyback on existing wireless infrastructure, thereby easing the cost and complexity of adoption in place of barcode or RFID based tracking systems. Specifically, the passive FSS based tags are tuned (e.g., by the geometry of their metallic structures) to interact with existing wireless signals used with network standards such as WiFi, 4G, and 5G (or alternative or forthcoming wireless or telecommunications network standards). The responses of individual FSS based tags are uniquely identifiable with appropriate detectors and signal processing algorithms. No integrated circuits (ICs) nor batteries or other power elements like inductive coils (which are common to RFID) are necessary, thereby minimizing cost and giving the tags considerable longevity. Indeed, some FSS based tags according to embodiments of the invention may be implemented as "cradle-to-grave" (CTG) tags, meaning the tags may be employed from the time an item is manufactured to the time at which it is disposed of.

A frequency selective surface (FSS) is an electromagnetic structure (or combination of structures) that resonates with a particular frequency. Depending on the frequency (or frequencies) of incident electromagnetic waves, an FSS selectively transmits, absorbs, or reflects the incident signals. FSSs which are different, in shape for example, may be selective for different frequencies from one another.

Exemplary embodiments comprise or consist of passive tags suitable for labeling, tracking, locating, mapping, and/or identifying respective objects, goods, packaging, persons, or some combination of these or other entities. Inventory tracking, such as in warehouse environments, is one example use context.

An exemplary FSS may be constructed from one or more conductive materials printed in one or more geometric shapes which resonate at certain frequencies based on their respective geometric patterns. Suitable conductive materials include but are not limited to copper, silver, and graphite. Suitable printing techniques include but are not limited to inkjet, screen, and gravure.

Exemplary FSS tags may be configured, such as by individual shapes and/or by spatial arrangement and density of an array of shapes, to reflect signals (resonate) in the range of 3 KHz to 300 GHz, or in particular 1 GHz to 10 GHz or 2.4 GHz to 10 GHz in some embodiments. Multiple geometric shapes may be integrated together within a single tag to influence the reflected response of the tag and thereby yield a unique signature for each respective tag out of many tags. Two or more FSS may be stacked together or arranged in the same/common substantially two-dimensional plane.

According to some embodiments, an exemplary ID tag for unique labeling and identification is provided with the ID tag comprising an array of one or more frequency selective surfaces (FSS) configured to produce a unique response when in the presence of a wireless signal. The unique response is usable to individually identify the producing array of FSS (e.g., as distinguished from other arrays of FSS).

An exemplary system may comprise a plurality of ID tags, one or more receivers, and one or more processors. The plurality of ID tags may each comprise an array of frequency selective surfaces (FSS) configured to produce a unique response or resonance when in the presence of a wireless signal, e.g., network signal. The receiver may be configured to receive the responses of at least some of the plurality of ID tags. The processor may be configured to determine a presence or absence of individual ones of a plurality of items or products to which the ID tags are affixed or with which they are integrated based on the received responses.

The receiver which detects signals produced or affected by the FSS-based tags may be integral with the transmitter that produces the initial wireless network signal to which the FSS-based tags are exposed. Detection of tags may be accomplished with, for example, broadband Wi-Fi receivers. A receiver may detect either transmission or reflection depending on the application. In some exemplary embodiments, reflection by itself is used in standard identification application with non-metal or thick material applications. Reflection detection in some ways mirrors or resembles detection of simple barcode scanning applications. Reflection detection is also useable for far distance detection (location tracking). Transmission may be used in hollow objects such as boxes. A combination of transmission and reflection may be used when a large number of detections are needed for a single company or when signals may pass through complex materials such as liquids or through metal objects.

The processor may be configured to execute computer readable instructions which implement algorithms which decode the received spectrum. For instance, a processor (or multiple processors) may perform deconvolutions of the received spectrums such that the unique signature from each tag may be positively identified.

Tracking system capacity may be large via employment of Wi-Fi frequencies. Widespread use of WiFi in homes and workplaces and WiFi being a universal standard allows for the tags to have a nearly unlimited range of detection. Wi-Fi allows for a lower barrier to entry making the tags simple to set-up and use. Unlimited range of detection allows for a large range of detection. Tags may tuned in potential directional and omni-directional applications. This sort of detection in combination with fine-tuned detectors increases accuracy.

Cost effectiveness may be obtained with: 1) tags which have no active elements and which are printable using low cost metallic (e.g., copper) inks, 2) existing network infrastructure used as the transmitter, 3) existing industry standards used to reduce software development costs, and 4) software which integrates with many current solutions as an effective conversion to industry standards (universal product code, UPC).

DETAILED DESCRIPTION

Figure 1:
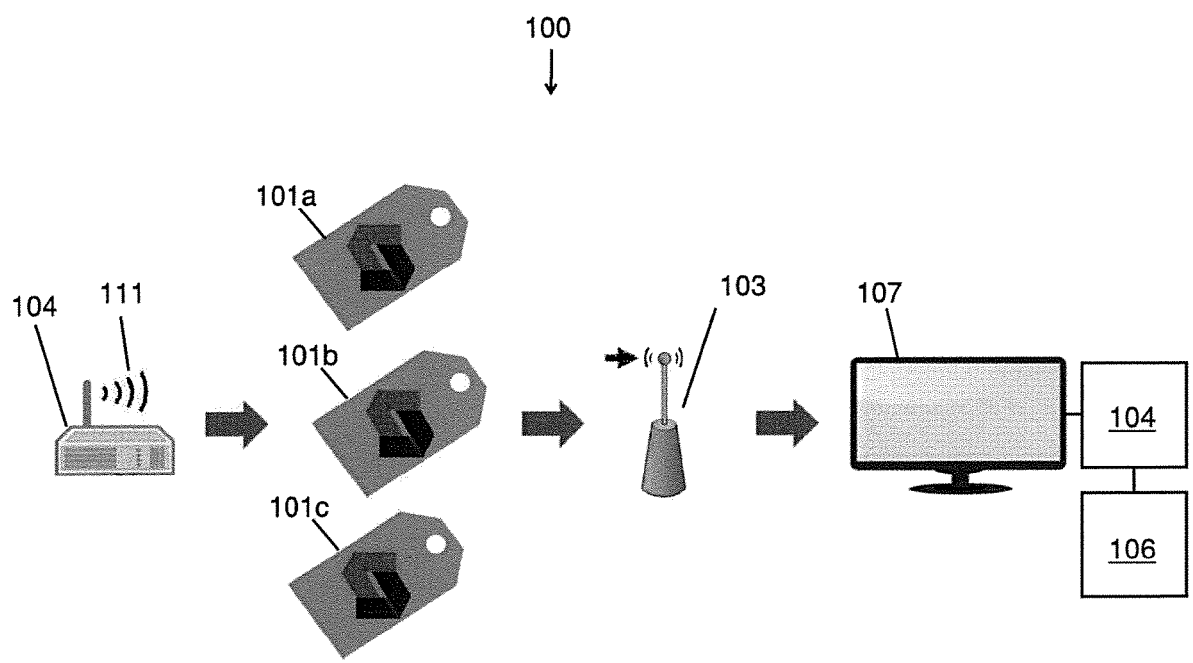
FIG. 1 is a schematic of a system for unique labeling, identification, and/or tracking using FSS antenna-based tags.

FIG. 1 is a schematic of an exemplary system 100 for unique labeling, identification, and/or tracking, e.g., of goods or items. The system 100 comprises a plurality of ID tags 101a, 101b, 101c, etc.; one or more receivers 103; and one or more processors 104. "Tags" according to exemplary embodiments described herein (e.g., tags 101a, 101b, 101c) may be characterized as "FSS-based", "antenna-based," or some combination of these. The actual number of tags in a single system could be tens (e.g., more than ten, twenty, forty, sixty, eighty, up to a hundred), hundreds (e.g., more than a hundred, two hundred, four hundred, five hundred, six hundred, eight hundred, up to a thousand), thousands (e.g., more than one thousand, two thousand, four thousand, six thousand, eight thousand, up to ten thousand), tens of thousands, hundreds of thousands, millions, or more.

For simplicity of discussion, the single noun "processor" may be used, but it should be understood that it may be one of many employed in connection with an embodiment of the invention. In other words, "a processor" may refer to a single processor but it may equally refer to multiple processors. Similarly, "a receiver" may refer to a single receiver but it may equally refer to multiple receivers (or devices which include means for receiving, e.g., a transceiver). Other nouns may also be used in the singular to concisely refer to both embodiments which may use one as well as embodiments which may use multiple of the specific entity in question. "Processors" may include but are not limited to a central processing unit (CPU), a general purpose computer (as a whole or a part thereof), a special purpose computer (as a whole or a part thereof), a server (as a whole or a part thereof), and other machines that process (especially machines configured to process digital data).

Operation of system 100 employs the presence of a wireless signal 111 which is advantageously but not necessarily a network signal (a telecommunications network signal, for example). A transmitter 104 configured to generate the wireless network signal 111 may be an element of the system 100. Alternatively, the transmitter 104 may be characterized as an element separate and apart from system 100, the latter simply exploiting a utility of the signal 111. The transmitter 104 may be, for example, a network router (e.g., WiFi router). The system 100 may further comprise a computer readable storage medium 106. The storage medium 106 may comprise volatile storage, e.g. RAM, and/or non-volatile storage, e.g. a SSD or similar. For users, especially human users, the system 100 may further comprise a software interface for presentation on a display 107, for example.

Whereas transmitter 104 may be a commercially available wireless signal router, receiver 103 may be a detector specially configured for detecting the responses of tags 101a, 101b, 101c, etc. The system 100 may be configured for use with wireless network signals spanning spectrum 3 KHz to 300 GHz, for example. For tags configured to resonate in the presence of WiFi according to existing WiFi standards, for example, the receiver 103 may comprise receivers for (WiFi) bands of 2.4 GHz and 5.3 GHz. In some embodiments, transmitter 104 and receiver 103 may be embodied in a single device. This may prove especially advantageous if the invention achieves particularly widespread adoption.

A system 100 permits identifying ID tags (and/or entities with which they are associated) based on the responses received from the ID tags. The responses received may be reflections or transmissions of a tag, or a combination of reflections and transmissions. Identification of a tag or tags may include differentiating or distinguishing the plurality of ID tags from one another based on the received responses.

Figure 2:
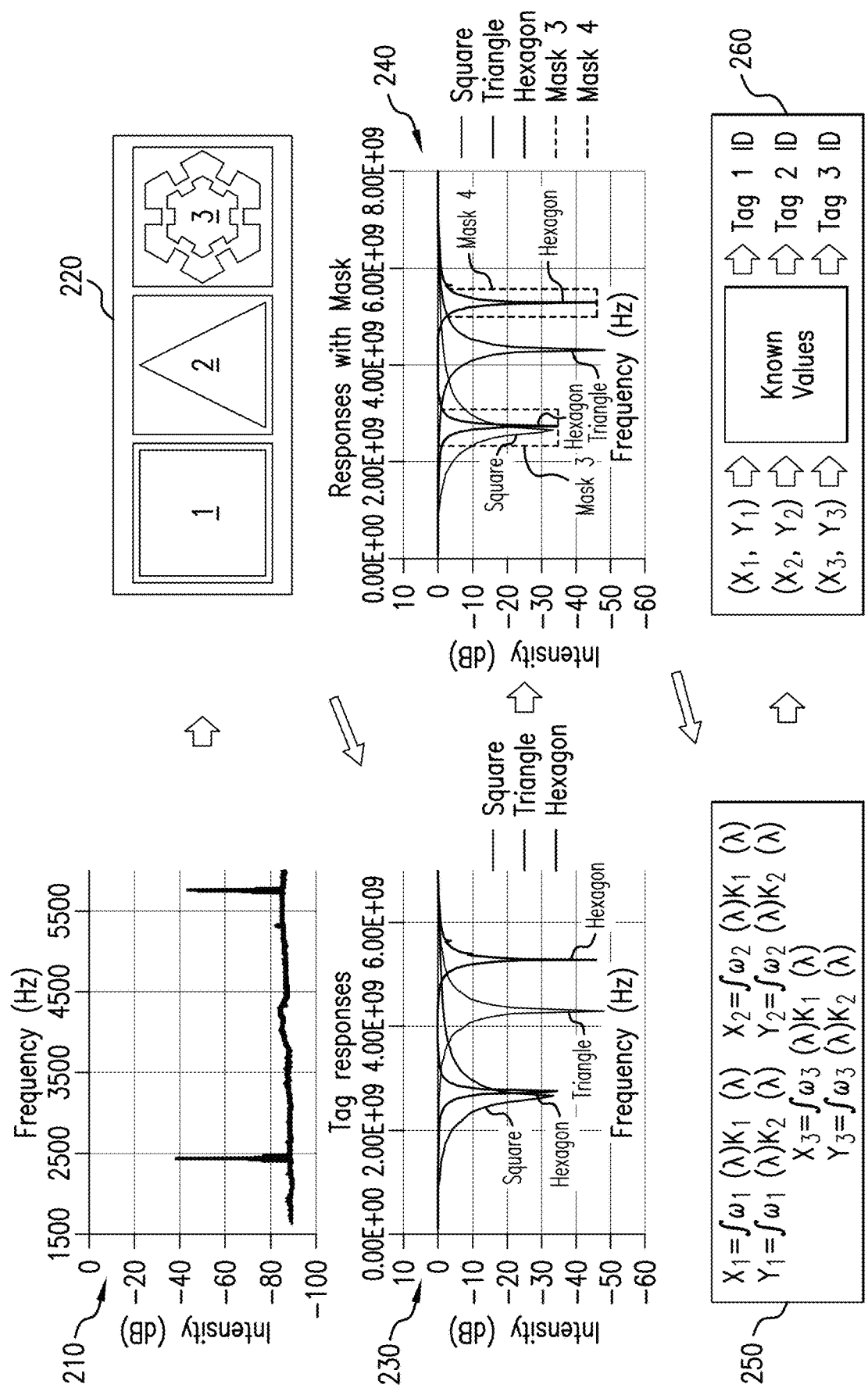
FIG. 2 shows antenna-based inventory tag methodology using ambient WiFi.

FIG. 2 is a flowchart showing different aspects and steps of using FSS-based tags to label and identify individual ones of a plurality of entities such as items or products. An identification process according to an exemplary embodiment may advantageously leverage use of existing wireless networks and their network signals. Exemplary existing network types and standards include but are not limited to 4G, 5G, and WiFi networks. Indeed some embodiments may piggyback on any one or more of 5G, 4G (LTE-A, WiMax), 3G (UMTS, LTE) and 2G (GSM) systems, and WiFi (IEEE 802.11 standards, e.g., 802.11a, 802.11b, 802.11g, 802.11n (Wi-Fi 4), 802.11h, 802.11i, 802.11-2007, 802.11-2012, 802.11ac (Wi-Fi 5), 802.11ad, 802.11af, 802.11-2016, 802.11ah, 802.11ai, 802.11aj, 802.11aq, 802.11ax (Wi-Fi 6), 802.11ay).

Though these networks are typically built for active communication, embodiments of the instant invention leverage their ability to serve as transmitters 104 (see FIG. 1) the signals from which are capable of interaction with passive elements of antenna-based tags. Because wireless network signals are frequently "always on" or available "24-7", meaning they are essentially available for minutes, days, months, or even years at a time (notable exceptions being comparatively short maintenance windows and unplanned outages measuring a month or less and typically a week or less and often a day or less), they advantageously provide a constant signal with which to continuously track passive tracking tags within the wireless network range. At the time of writing this disclosure, WiFi is an exemplary network signal because of its coverage and widespread usage in businesses and homes. It is also configurable by individual end-users; e.g., a company with warehousing operations that uses FSS-based tags may have control over the WiFi signal in its own warehouse. The steady outgrowth of 5G network availability also may make this network exemplary in years to come.

Signal 210 of FIG. 2 is representative of a wireless network signal such as WiFi. The signal as illustrated is dual band. Tags 220 are arranged within the range of the signal 210 and tuned to the signal 210 so that they each produce a unique response or resonance when in the presence of the signal 210. For instance, the shape of the FSS of the tags 220 may be tuned to WiFi specifically and allow for a unique response in the presence of WiFi. A single tag 220 need not necessarily be tuned to only a single type of wireless signal. In some embodiments, a tag 220 may be configured to resonate in response to multiple different wireless signals, e.g., WiFi, 4G, and/or 5G signals, thereby allowing for detection in dynamic applications. The tags may comprise, for example, copper FSS designs (labeled 1, 2, and 3 in FIG. 2) built on a dielectric substrate (e.g., 1/16"). Other physical characteristic attributes and materials may be employed to uniquely configure respective tags as described elsewhere in this disclosure.

Signals 230 of FIG. 2 are representative of the responses (resonances) (transmitted signal in this example, but reflected signal may alternatively or additionally be used) of the FSS of the tags 220. In FIG. 2 the three different illustrative FSS are labeled 1, 2, and 3, respectively. FSS 1 is a square. FSS 2 is a triangle. FSS 3 is a meandered loop. FIG. 2 shows how each FSS has a unique response or resonance 230 despite their exposure to the same incident signal 210. Signals 230 are detected with a receiver 103 (see FIG. 1).

Next the detected signals 230 are to be decoded to identify the tags or, more specifically, the FSS thereof which produce the received signals. Identification may be supplemented with or include a determination of a presence or absence of individual ones of the plurality of tags 220 based on the received responses. The receiver 103 (see FIG. 1) may detect signals 230 but not necessarily differentiate the signals from one another. For this purpose one or more processors 104 and references values from storage medium 106 (see FIG. 1) may be employed. The processor 104 may comprise or implement a spectrum analyzer (e.g., Signal Hound BB60C in a prototypical setup) and allow filters to be run over the signals 230 to obtain spectrum response 240. In this instance, based on the original dual band WiFi signal, filters (e.g., kernels) are run over the spectrum response at 2.4 GHz and 5.3 GHz with width of 0.5 GHz and variable length. In FIG. 2 at 250 the kernels are labeled K1 and K2. The kernels allow convolutions 250 to be performed calculating two-dimensional coordinates ((X1, Y1), (X2, Y2), (X2, Y3)) which correspond respectively back to the FSS 1, 2, and 3 of tags 220. The calculated coordinate values are compared against reference values 260 which permit matching individual ones of the plurality of ID tags to the unique responses or resonances which the plurality of ID tags respectively produce in the presence of the wireless network signal.

FIG. 2 gives a "comprehensive" picture of a tracking and identification system at work. At a finer resolution, the system and method depicted by FIG. 2 may be described according to two parts. The first part is the individual ID tags and the characteristics/configurations of the ID tags. With respect to FIG. 2, this particularly entails elements 220 and 230. The second part is the receiver/detector/signal analyzer. With respect to FIG. 2, this particularly entails elements 240, 250, and 260. Some embodiments of the invention may be specifically directed to just the ID tags of the first part. Other embodiments of the invention may be specifically directed to just the receiver/detector/signal analyzer of the second part. Still further embodiments may comprise both the first and second parts.

Exemplary ID tags each comprise an array of one or more frequency selective surfaces (FSS) configured to produce a unique response (e.g., resonance) when in the presence of a wireless network signal, the unique response (e.g., resonance) is usable to individually identify the tag itself and, as a corollary thereto, an item or product or other entity to which the producing array of FSS is affixed or with which the producing array of FSS is integrated. A single array may comprise or consist of a one FSS, two FSS, three FSS, or more than three FSS (e.g., 5, 10, 15, 20, 30, 40, 50, etc.). One or more of several parameters of FSS and/or the system in which they are employed may be varied to control spectrum response and make each tag's response unique. Such parameters may include but are not limited to i) Geometric shape, ii) geometric dimensions or size, iii) arrangement (in a two-dimensional plane), iv) stacking of FSS layers (three-dimensional arrangement), v) material(s), vi) attenuation, and vii) timing of incident wave.

FIG. 2, tags 220, shows three different FSS shapes which, because of their different geometries, have different spectrum responses 230. Unique responses may be achieved by using virtually any geometric shape provided it resonates at a specified frequency (or frequencies) of interest.

Figure 3:
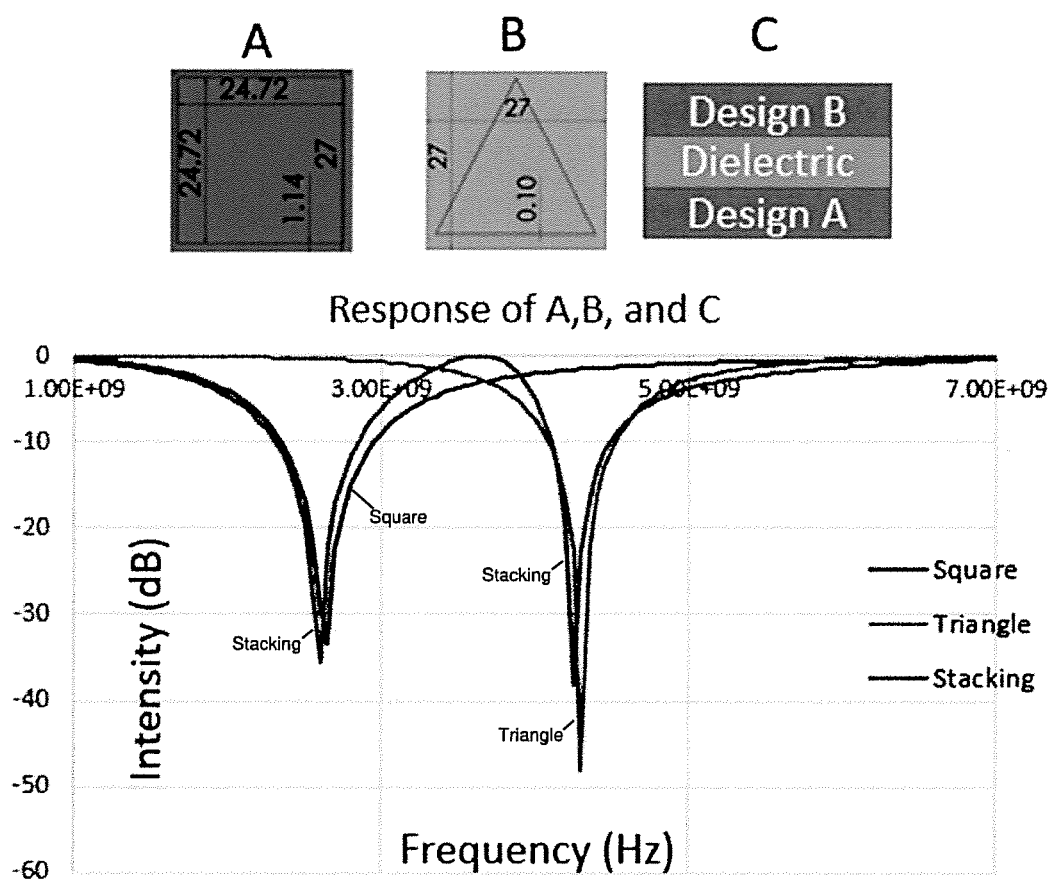
FIG. 3 shows tag spectrum responses which differ with varying geometries.

FIG. 3 illustrates how standard geometries may each create a unique response. FIG. 3 further shows how 3D separation (in this case 1 mm for example) can cause a unique response. This allows for not only 2D level control of response, but a third dimension of control. This builds directly on FIG. 2's indication of how geometry may vary to yield unique responses. The different geometries (A is a square, B is a triangle, and C is one square and one triangle stacked together) results in three unique responses as shown in the bottom half of FIG. 3.

Figure 4A:
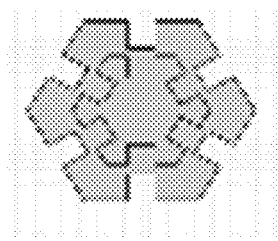
FIGS. 4A, 4B, and 4C show different exemplary FSS trace geometries.
Figure 4B:
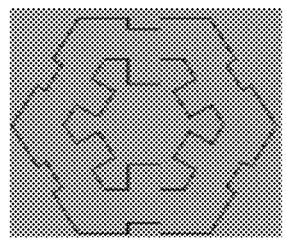
Figure 4C:
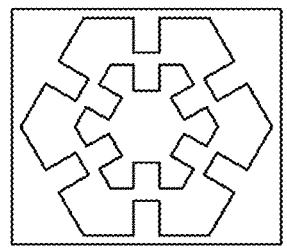
Figure 4D:
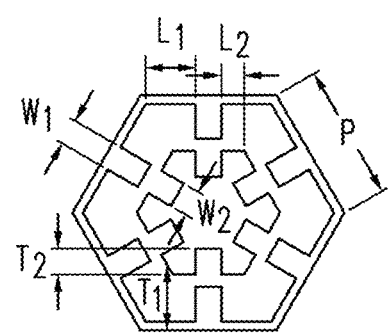
FIG. 4D shows different dimensions which may be manipulated for a particular exemplary FSS geometry.

Geometric shape is not the only parameter of an FSS which may vary from one tag to another in order to achieve separate unique frequency responses. FIGS. 4A to 4C and 5A to 5C exemplify how dimensional characteristics of what may be qualitatively or nominally the same shape may differ among tags so that each tag has a unique frequency response. Each of FIGS. 4A, 4B, and 4C show an FSS which comprises a combination meandered loop hexagon. The combination hexagon consists of two concentric six-petaled hexagons. FIG. 4D labels seven different dimensional characteristics which may vary among separate FSS tags, respectively labeled as T1, L1, L2, W1, W2, T2, and P. Merely for illustration, example dimensions are T1=3.35 mm, L1=4.95 mm, L2=2.4 mm, W1=3 mm, W2=3 mm, T2=2.5 mm.

Figure 5A:
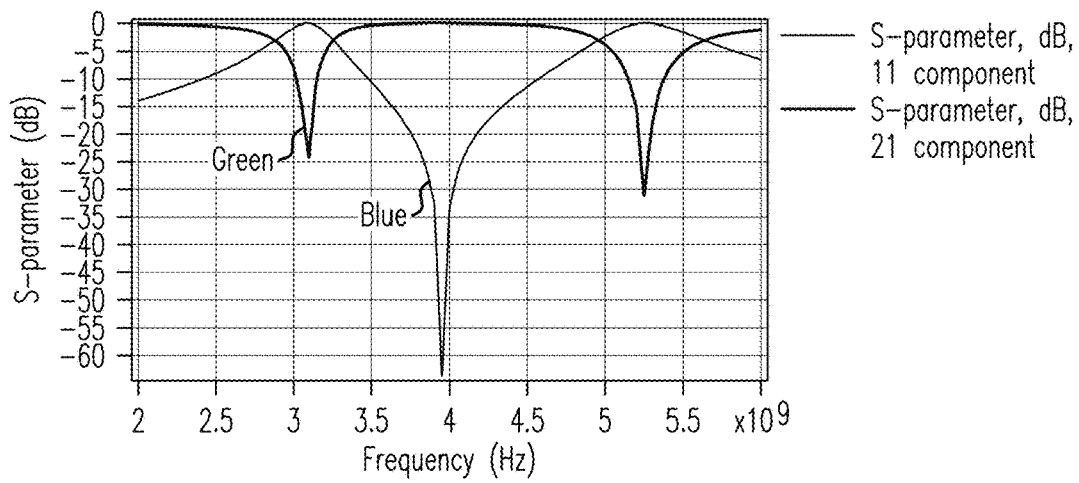
FIGS. 5A, 5B, and 5C show the responses of the FSS from FIGS. 4A, 4B, and 4C respectively, when exposed to a WiFi signal.
Figure 5B:
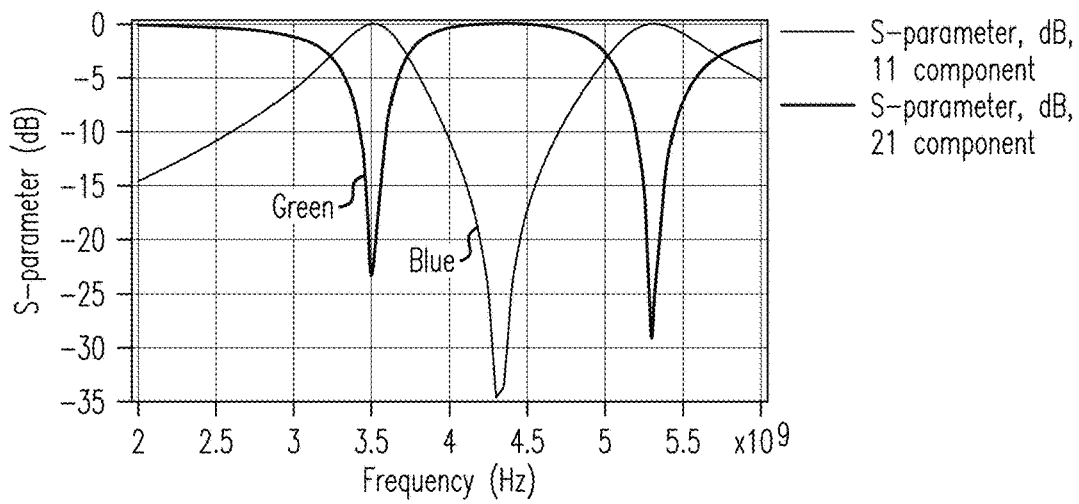
Figure 5C:
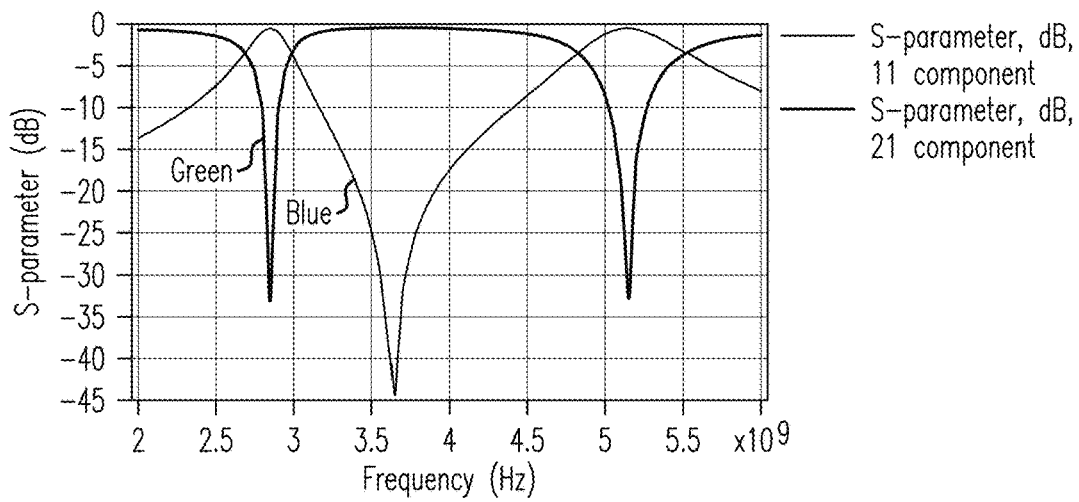

FIGS. 5A, 5B, and 5C show the reflection and transmission characteristics of the respective FSSs of FIGS. 4A, 4B, and 4C. Each of the FIGS. 5A-5C shows the reflection (green) and transmission (blue) of the electromagnetic signal as it interacts with the FSS shape shown in the correspondingly labeled figure of FIGS. 4A-4C. It is apparent from the reflection and transmission responses that the fine adjustments in shape dimensions permit finely tuned control over the reflection (and transmission) amplitude and position.

Figure 6A:
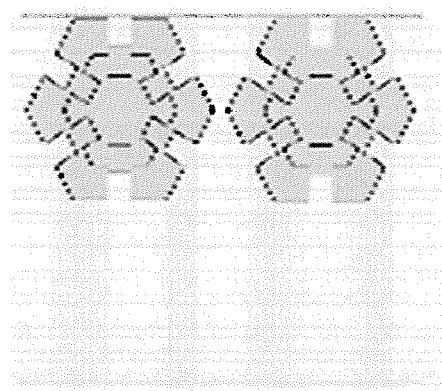
FIGS. 6A, 6B, and 6C show examples of FSS arrays which differ from one another based on factors such as arrangement as well as geometries.
Figure 6B:
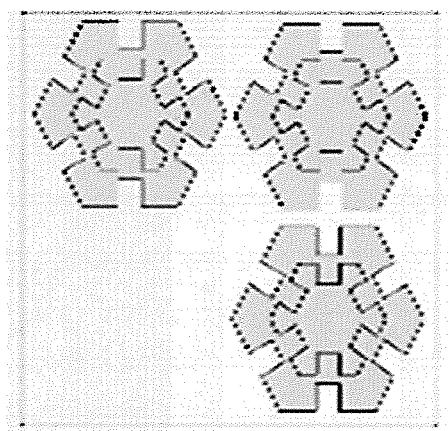
Figure 6C:
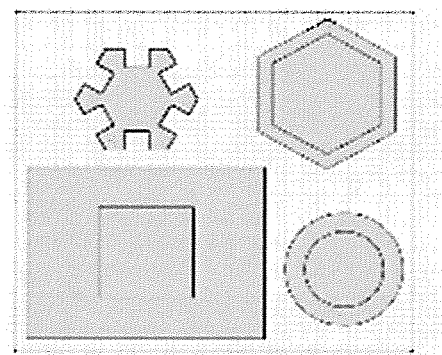

FIGS. 6A to 6C demonstrate still further aspects of exemplary tags which may be variable among a plurality of tags such that each tag has a unique response or resonance in the presence of a wireless network signal like WiFi. In FIGS. 6A to 6C, different numbers of geometric shapes are positioned in close proximity. Unique spatial patterns of greater or fewer resonate geometries allows control of the amplitude and position of the reflected and transmitted signals.

Figure 7A:
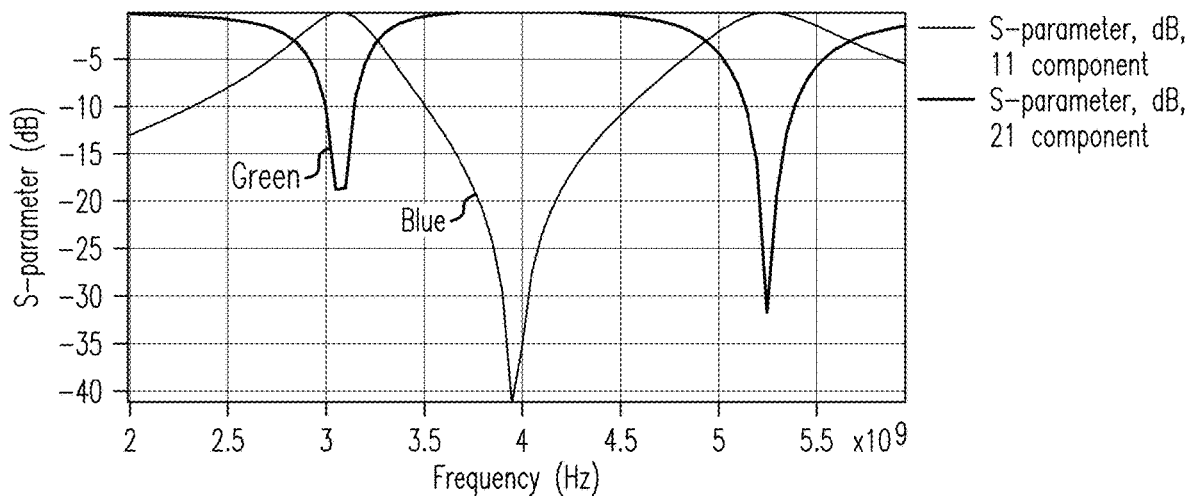
FIGS. 7A, 7B, and 7C show the responses of the FSS arrays from FIGS. 6A, 6B, and 6C respectively.
Figure 7B:
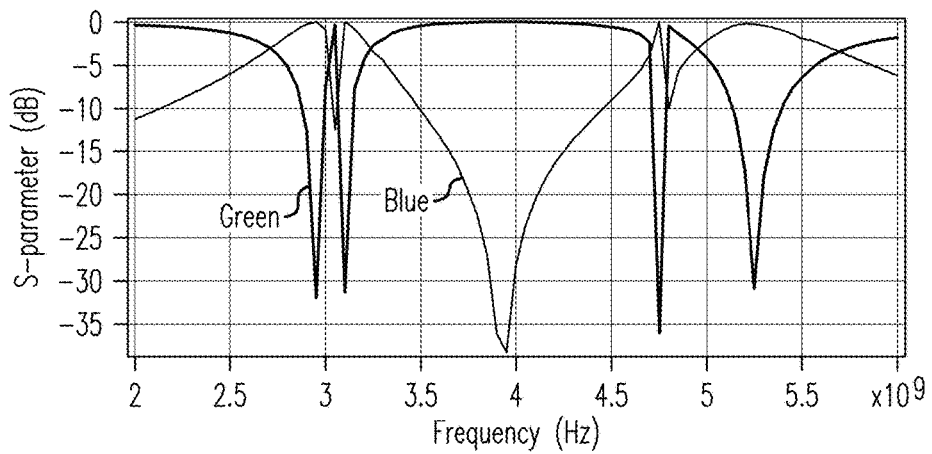
Figure 7C:
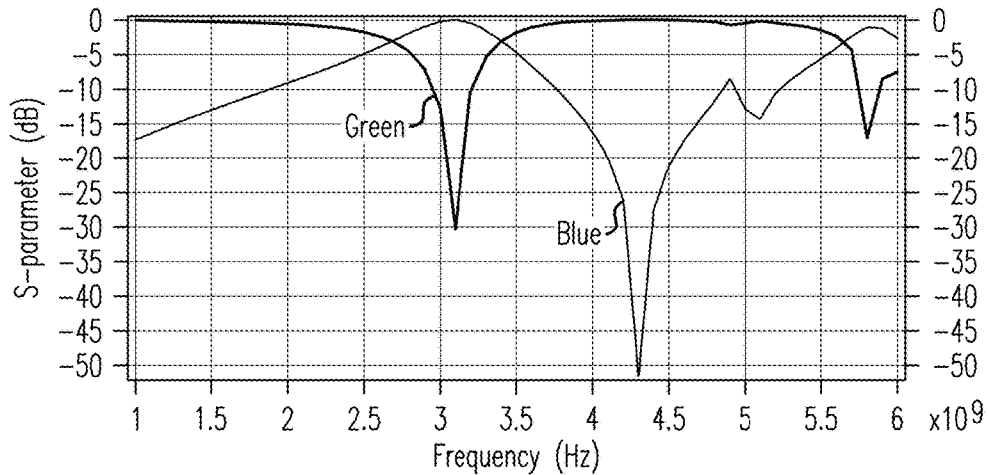

FIGS. 7A, 7B, and 7C show the reflection and transmission characteristics of the respective FSSs of FIGS. 6A, 6B, and 6C. Each of the FIGS. 7A-7C shows the reflection (green) and transmission (blue) of the electromagnetic signal as it interacts with the FSS patterns of individual tags shown in the correspondingly labeled figure of FIGS. 6A-6C.

Figure 8:
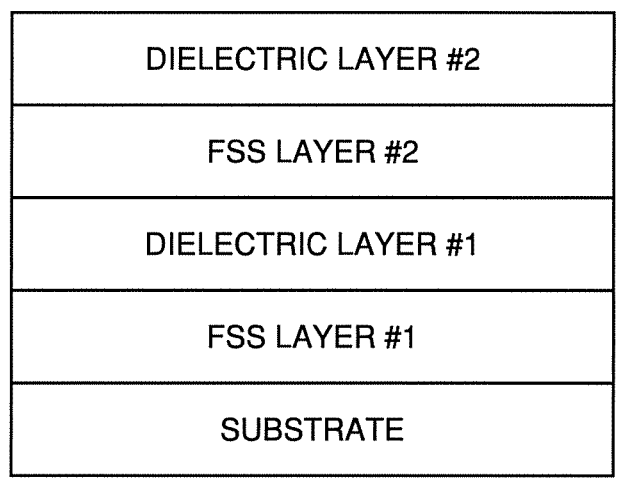
FIG. 8 shows an example stacked array of FSS elements.

FIG. 8 illustrates yet another aspect of exemplary tags which may be variable among a plurality of tags such that each tag has a unique response or resonance in the presence of a wireless network signal like WiFi. In FIG. 8, multiple FSS are stacked vertically, e.g., in what may be labeled as a z-axis. This is a simple diagram of the design of FIG. 3 Design C. A single tag may therefore have a two-dimensional or three-dimensional array of FSS. As an exemplary process for making a stacked FSS array such as depicted by FIG. 8, multiple films may be individual produced as described above, then laminated or enclosed together to produce a three-dimensional arrangement. Any dielectric or material that is a polarizer may be used in the dielectric layers. Thin film production techniques become particularly advantageous with respect to three-dimensional arrays; the more FSS layers which can be fit into a predetermined volumetric space, the greater the variability and control over the spectrum response among a plurality of such arrays. In addition, thinner tags also facilitate roll-to-roll manufacturing. As exemplary illustrative example, a particular stacked array of FSS may comprise FSS and dielectric layers each 10-60 microns in thickness, with a tag total thickness of up to 100 microns. By these dimensions, as many as 10 different FSS may be stacked together in what remains a very small and unobtrusive total size. This is but one example, and other dimensions and configurations are also conceived.

Material selection is another parameter which may be used to control or influence the resonance or frequency response of an FSS. Exemplary materials are describes above.

Figure 9:
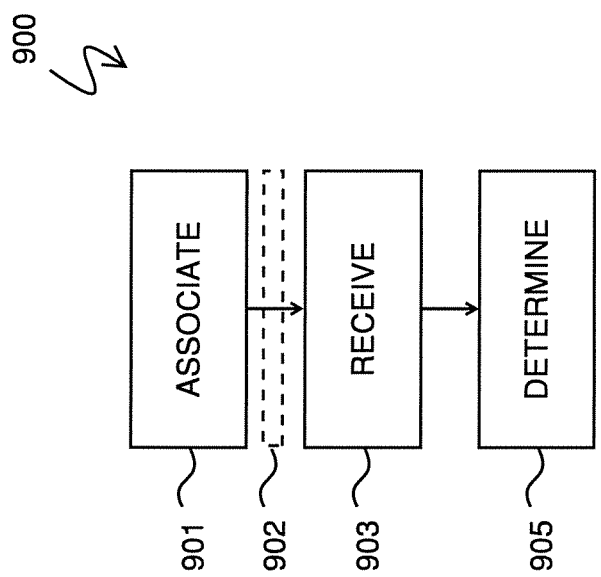
FIG. 9 is a method of unique labeling and identification of, for example, goods or items.

FIG. 9 turns attention to detection and tag identification (e.g., elements 240, 250, 260 of FIG. 2). A comprehensive system (e.g., a comprehensive inventory tracking system) need not just have uniquely tuned FSS-based tags on respective goods or items. Such a system also generally requires means for detecting each unique tag's spectrum response, differentiating it from among others, and tying it back to an ID that the spectrum response symbolizes (e.g., a particular spectrum response corresponds with an ID tag affixed to the box of a Samsung Galaxy S®10 and not to an ID tag affixed to a carton of milk; as an even more granular example, a particular spectrum response corresponds with an ID tag affixed to a Samsung Galaxy S®10 with one specific serial number and not any other Samsung Galaxy S®10 phones which have other serial numbers).

FIG. 9 is a flowchart for a method 900 of unique labeling and identification, e.g., of goods or items. (Indeed, though the invention is especially well suited for inventory tracking, it could be used for virtually any entity, including but not limited to consumer goods, weapons, drugs, livestock, food stuffs, persons, employees, personnel, etc.). Block 901 entails associating each of a plurality of such entities (item, products, persons, etc.) with its own ID tag. Association may comprise, for example, affixing to each of a plurality of items or products a different ID tag comprising an array of frequency selective surfaces (FSS) configured to produce a unique response (e.g., resonance) when in the presence of a wireless network signal. Affixing may include adhering, stapling, or tying, for example, to a thing or its wrappings (e.g., packaging, casing, housing, clothing, etc.). Affixing may involve application to an outside part or an inside part, e.g., to an area of a device which is not visible on the exterior. Affixing may be temporary or permanent. As one example use scenario involving persons, personnel in a workplace may temporarily affix a badge or nametag which is or includes a FSS-based tag while on the job, allowing workplace attendance to be tracked or location of workers to be known while on the job. Associating may comprise physical integration, e.g., the FSS tag is printed directly onto a permanent part of the thing it is meant to ID and permit tracking of. Tags may be placed on finished goods or unfinished goods. For example, tags may be placed inside goods or packaging through an original process of manufacturing the good or packing or through a process following completion of the manufacturing of the good or packaging.

Block 902 is the tag, now deployed, interacting with an ambient wireless signal as discussed in detail above.

Block 903 comprises receiving the responses or resonances of at least some of the plurality of ID tags which were affixed at block 901. Generally this is achievable with one or more antennas of a receiver (e.g., receiver 103 of FIG. 1).

In some embodiments, the receiver is preferably configured to receive and record (or at least permit recording of) a spectrum response that is "continuous". This may be achieved with receiving transmission or reflection of focused point then approximating the graph through Fourier Series. The equations required of Fourier Series Approximation are outlined in Eq 1 and Eq 2 below.

$$A_k = \frac{1}{2L}\int_{-L}^{L} f(x)\cos\left(n\frac{\pi x}{L}\right)dx \quad (1)$$

$$B_k = \frac{1}{2L}\int_{-L}^{L} f(x)\sin\left(n\frac{\pi x}{L}\right)dx \quad (2)$$

Using the cosine and sine characteristics, an effective approximation may be achieved through conversion via Fourier Series. An advantage to employing Fourier series is a reduction in the electronics required for individual signal detection and isolation. This approach may be used to eliminate the need for a full spectrum sweep, e.g., as performed with a spectrum analyzer (e.g., Signal Hound BB60C) as described herein for an alternative embodiment. Accordingly a very cost-effective detector may be achieved.

Block 905 comprises determining useful information, including but not necessarily limited to identifications, from the signals received at block 903. Though the receipt step 903 may involve detecting one and only one FSS tag resonance signal (or for that matter, no signal at all), it may be generally expected that most use scenarios will entail tracking a plurality of entities and therefore a plurality of tags, the large number of which make other means of ID and tracking, e.g. manual with human eyesight and memory recognition, impracticable if not impossible.

The determination (or determinations as the case may be) at block 905 may be one or many depending on the embodiment. Block 905 may comprise determining identification of tags and/or the respective entities with which they are associated. Block 905 may comprise determining a presence or absence of individual ones of the plurality of entities based on the received responses or resonances. Block 905 may comprise determining a count of respective types of goods, e.g., in answer to the inquiry of how many of good A is stocked in a warehouse, versus how many of good B is stocked in a warehouse, versus how many of good C is stocked in a warehouse, and so on, where goods A, B, and C are all distinguishable from one another (but any two goods both of type A are substantially identical, any two goods both of type B are substantially identical, any two goods both of type C are substantially identical, and so forth). Block 905 may a temporal determination. For example, the presence or absence of a particular ID tag may be determined for two or more different times with some nonzero duration of time between, and from this information the delay determined during which the ID tag remained in one location or locale (e.g., in a particular warehouse or facility). Other determinations may also or alternatively be made at block 905. The determinations of block 905 may be made using the technique outlined above using FIG. 2.

Figure 10:
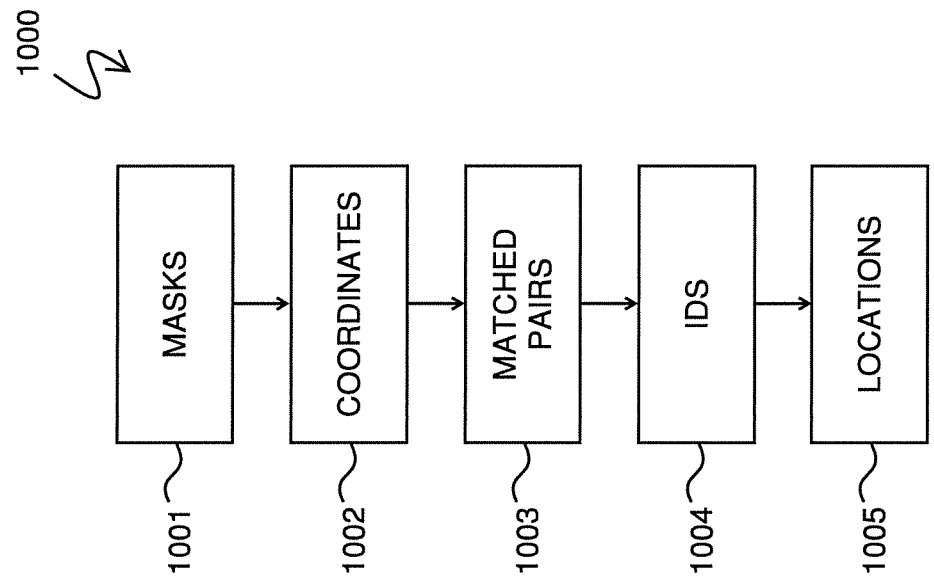
FIG. 10 is an exemplary method of identification of FSS tags.
Figure 11A:
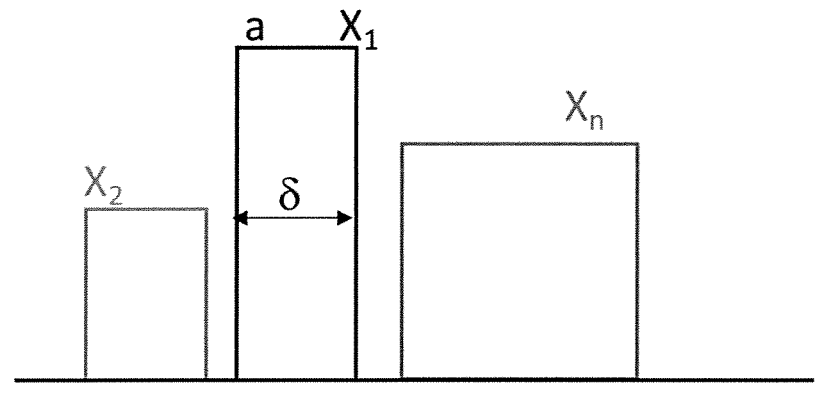
FIGS. 11A, 11B, and 11C are illustrations of basic masks or kernels.
Figure 11B:
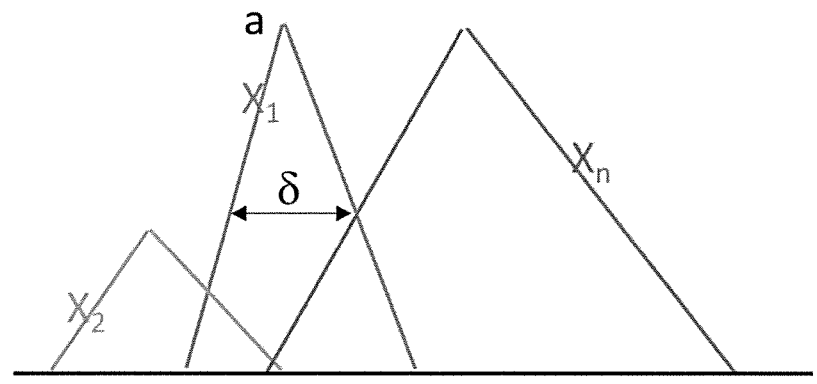
Figure 11C:
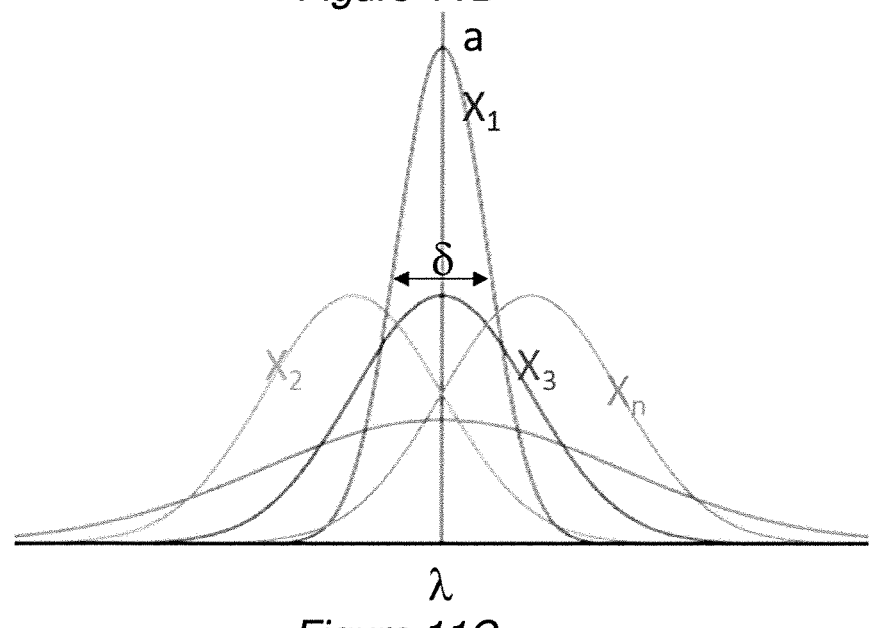

FIG. 10 details a method 1000 for uniquely identifying individual ID tags from among many signals received at block 903 FIG. 9, enabling the useful determinations of block 905. As an initial high level run-through, method 1000 involves applying masks 1001 to produce coordinates 1002 to make matched pairs 1003 to yield individual identities/identifications (IDs) 1004. In some embodiments, locations 1005 may also be determined for respective ID tags. In an exemplary implementation of methods 900 and 1000, the plurality of unique patterns from the FSS-based tags detected as a continuous spectrum measurement at 903 are run through an algorithm to distinguish the individual spectrum response patterns. In this example this is accomplished through an integrating over a defined frequency the product of the reflected signal and a predetermined mask 1001 as shown in the equations below.

$$Y_1 = \int \omega(\lambda) K_1(\lambda) d\lambda$$

$$Y_2 = \int \omega(\lambda) K_2(\lambda) d\lambda$$

$$\vdots$$

$$Y_n = \int \omega(\lambda) K_n(\lambda) d\lambda$$

Where $Y_1$ to $Y_n$ is the numeric result of the integrated function over a frequency of 2 to 10 GHz; $\omega(\lambda)$ is the reflected spectrum from the plurality of FSS tags, and $K_1(\lambda)$ to $K_n(\lambda)$ are masks 1001. The masks may be continuous functions across the spectrum of interest and may include but are not limited to square (e.g., FIG. 11A), triangular (e.g., FIG. 11B) and gaussian (e.g., FIG. 11C) wherein the position of the mask maximum ($\lambda$) and width ($\delta$) and amplitude (a) may be predetermined. As among different embodiments, one may employ a greater number of masks 1001 to permit a greater number of FSS tags to be used simultaneously within a single tracking system. As the number of masks increases, the resolution of the system (number of unique tags) increases and allows for more combinations of shapes and geometries for the tags.

In some embodiments, the masks 1001 are kernels configured to determine the dominant frequency components of a detected spectrum. The masks 1001 are employed in performance of convolutions on the signal received at block 903 (FIG. 9) to calculate coordinate values 1002.

Application of a kernel may accord with Eq. 3 for example:

$$X_n = \int \omega_n(\lambda) * K_n(\lambda) d\lambda \qquad (3)$$

where $X_n$ is the numeric result of the integrated function over a specified frequency; $\omega(\lambda)$ is the reflected spectrum from the plurality of FSS tags, and $K_n(\lambda)$ is a mask 1001. In essence, each tag's unique spectral response is reduced to a set of coordinate values 1002, and in particular here, a pair of coordinate values (characterized as an X coordinate and Y coordinate).

A more specific example of Eq. 3 being employed is illustrated in FIG. 2. There, two kernels are applied according to the following characteristics: 2.4 GHz at intensity of −33 with width of 0.5 GHz and 5.3 GHz at intensity −45 with width of ½ GHz as well. Kernels such as these may be made with control over center, width, and height allowing for them to be achieved at any band or signal. Moreover, this allows for simple integration to industry standards for easy conversion to new hardware as more kernels allow for more potential data to be stored.

The FSS tag spectrum responses being reduced to sets (e.g., pairs) of discrete coordinate values 1002, the coordinates are subjected to matching pairing 1003 against pre-existing/known reference values which tie each set of unique values to a specific ID tag affixed back at block 901 of FIG. 9. Accordingly, for each matched pair, a specific ID 1004 (of an ID tag) results. The ID may be, for example, a product serial code. Any of a variety of unique labeling schemes in existence or later developed may be associated with ID tags according to the invention (e.g., VIN numbers already used in the automobile industry may be stored on FSS-based ID tags permanently affixed to respective automobiles). Alternatively, the ultimate ID 1004 may not conform to any common or even existing labeling schema. FSS antenna-based tags may achieve letters (geometric shapes) or words (combination of geometric shapes), and this considers only two axes of spatial arrangement of FSS geometric shapes. With the ability to stack the geometric traces, a nearly unlimited number of tags may be achieved within a single tracking system and single tracking environment.

Exemplary frequency selective surfaces and tags comprising FSS may be manufactured using a variety of established manufacturing techniques. Conductive traces of an FSS may be printed using, for example, inkjet printing, screen printing, and/or gravure coating. Small scale inkjet printing may be achieved with, for example, a Fuji Film DMP-2850 Diamatrix printer. Production scale printing may of course employer alternative printing devices available on the market or developed at a future date. PCBs may be employed. Thin film production techniques may be employed (e.g., to produce tags with multiple layers with dielectric spacers).

A variety of conductive materials may be employed as ink such as but not limited to gold, silver, copper, or graphite. Such materials may be combined with other constituents facilitative to the method of manufacture. For instance, metals may be dispersed in a carrier solvent to facilitate printing. After deposition of inks on a substrate, the solvent may be permitted to evaporate. Evaporation may be facilitated, e.g., by heating and/or air circulation over the substrate. In some embodiments the post-deposition stage may include a sintering step. Post-deposition steps may include one or more of a thermal bake, intense pulsed light sintering, microwave plasma, and application of other energetic sources which cause neighboring metal particles to sinter together thereby producing a cohesive and continuous conductive trace.

The following is an example manufacturing process for producing a sample tag. Variations and alternatives to this example may occur to those of skill in the art in view of the teachings of this disclosure. A silver inkjet ink, such as PE410 by Dupont, is deposited onto a flexible polyethylene terephthalate (PET) substrate using an inkjet printer, such as a Dimatix DMP 2850 by Fuji Film, into predetermined shapes. The antennas may be printed with a thickness of 100 microns, for example, down to 10 microns. The traces are then inserted into a 130° C. oven for 20 minutes to produce the desired conductivity.

Tags may be made in or on an item with a protective layer preventing ware and reducing the potential for de-tuning.

Achieving capacity, simplicity, and accuracy with cost-effectiveness allow for a product level inventory tag called Cradle-to-Grave (CTG) in some embodiments. A CTG inventory tag is an inventory tag that goes on (e.g., is applied to or built into the product) during the manufacturing and acts as the universal identifier for the entire life of the product. CTG tags allow for identification and location throughout every step of the supply-chain beyond the initial stage of manufacturing including even the consumers home. This CTG methodology revolutionizes the industry of inventory by allowing effective data at every step of the supply chain and efficiency growth beyond currently possible towards individualized products. Some embodiments may achieve non-linear tracking with omni-directional antennas for omni-directional detection of a CTG inventory tag.

Figure 12A:
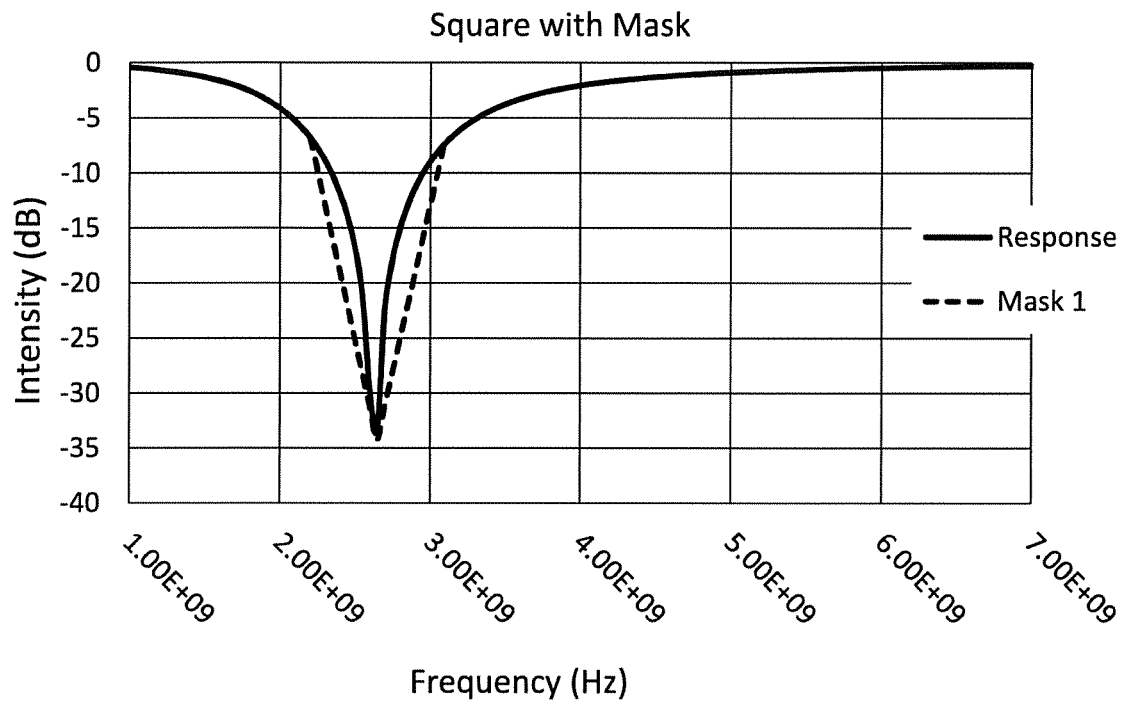
FIG. 12A, 12B, 12C are responses of tags with example kernels to properly convolute.
Figure 12B:
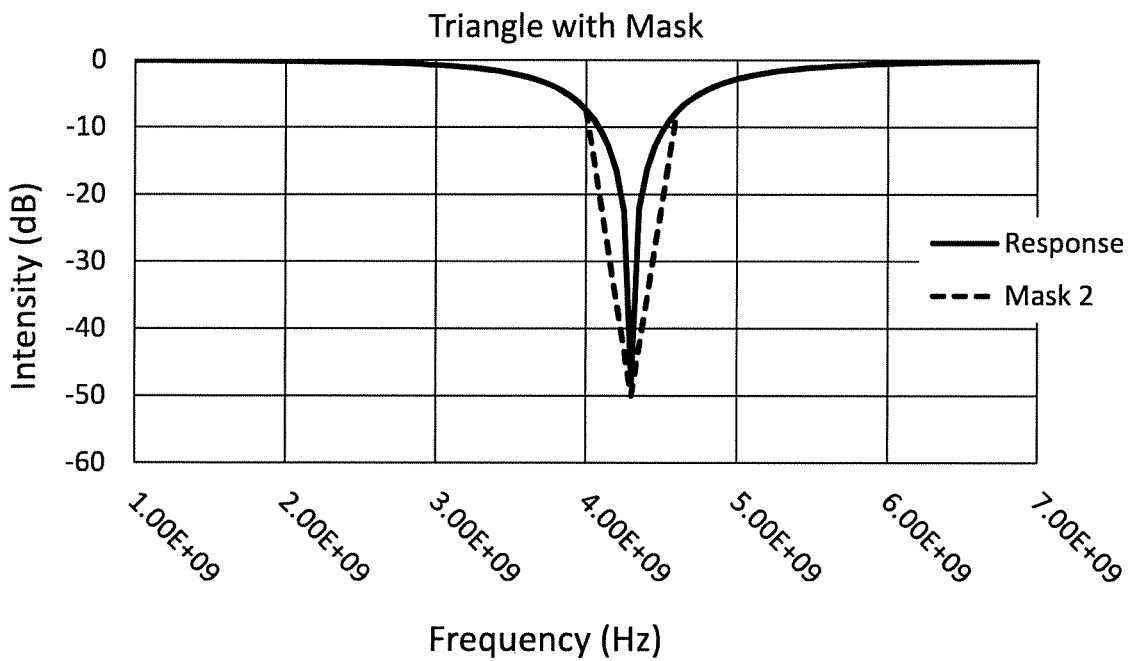
Figure 12C:
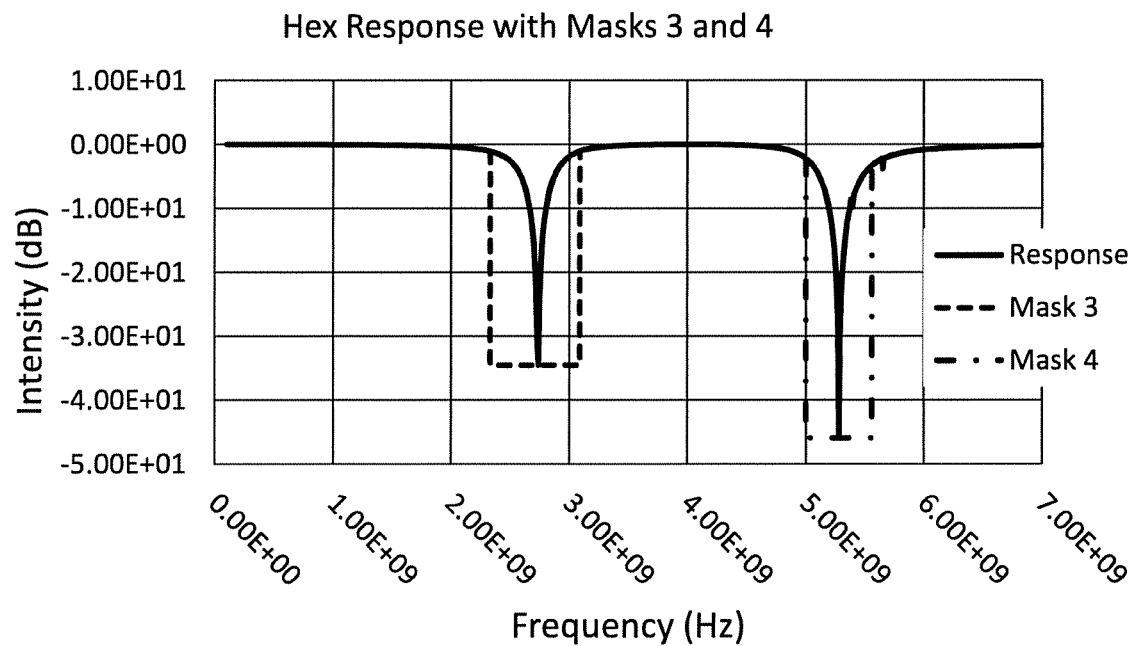
Figure 12D:
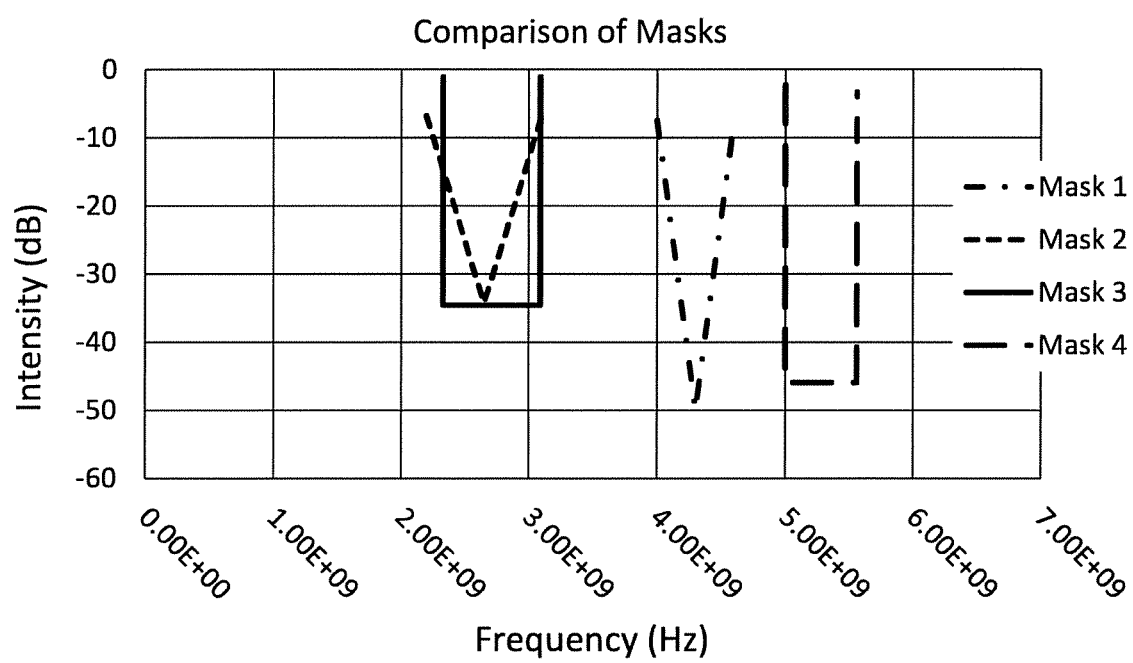
FIG. 12D compares the kernels from FIGS. 12A, 12B, and 12C in an illustration.

FIGS. 12A, 12B, and 12C show with respect to designs from FIG. 2 example kernels tailored to the respective unique responses. FIGS. 12A and 12B show how a triangle mask may be used using a given center point, length, and height, any one or multiple of which may differ from one mask to the next. FIG. 12C shows two rectangular masks each created using a different given center point, length, and/or width. FIG. 12D is a direct comparison of the four masks given in FIGS. 12A, 12B, and 12C. Overall, any number of kernel signals may be used to account for any RF spectrum response no matter the peak, number of resonates, or strength of signal.

An identification or tracking system such as system 100 of FIG. 1 may be configured and used not just for purposes of identification or tracking but also for locating. Generally speaking, identification may give a thing a name, and tracking may give a yes or no answer to whether that thing is present or absent from a given place such as a warehouse (e.g., inventory tracking). Locating may go a step further by determining not just whether a tracked thing is present or absent in a space, but also determining where within the space the thing is. As a general example, tracking may assess and provide a determination of whether a particular good or product or item or staff member is located in a warehouse which has a WiFi network therein. Locating may determine that the entity tracked is not just within the warehouse, but more specifically located in the NE quadrant of the warehouse versus the SW quadrant of the warehouse, or that the entity tracked is in a particular row of shelving as opposed to other rows in the warehouse, or that the entity is on a particular shelf as opposed to other shelves, or that the entity is at particular location coordinates (e.g., GPS coordinates or some other location coordinate system, standardized or unstandardized).

Figure 13:
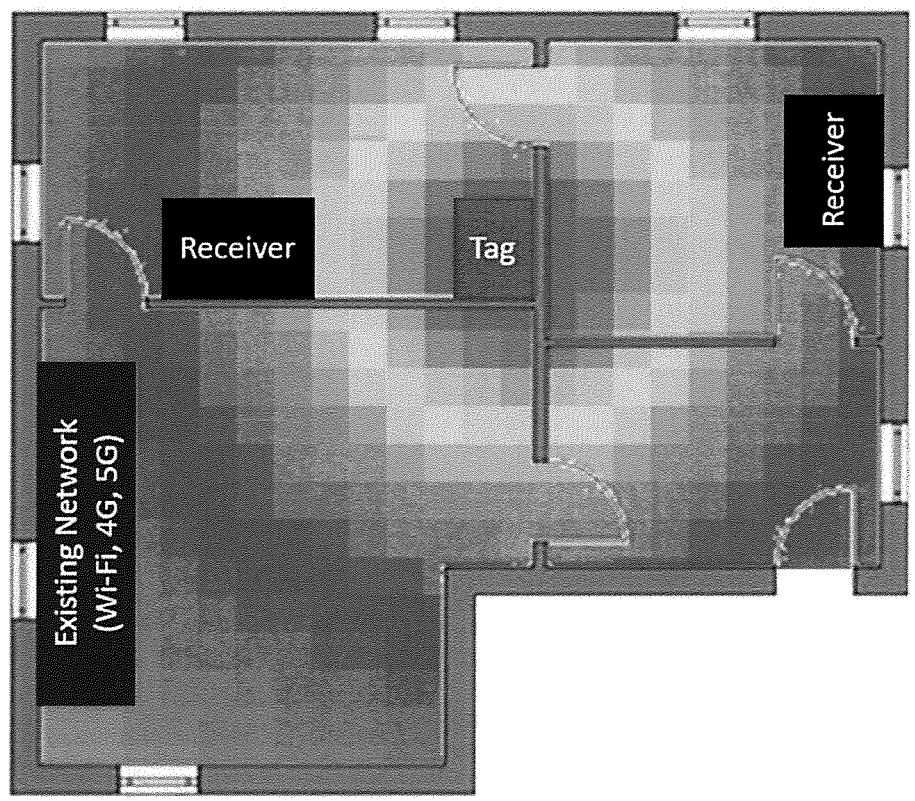
FIG. 13 is a Wi-Fi location heatmap according to an example embodiment.

FIG. 13 depicts a heatmap for location determination. In this particular example, the tracking system coverage is of a facility with four rooms, and it may be desired to locate an ID tag (and/or whatever entity is associated with that ID tag) specifically within that space (e.g., in one room versus one of the other rooms). The geometric patterns of FSS disrupt the electromagnetic signal and cause unique reflections. These reflections can be mapped using receiver signals similar to Wi-Fi heatmaps. Wi-Fi Heatmap is a chart showing the signal throughout a room based on different colors. Each color represents the strength of the signal. The colors may be green, yellow, orange, and red, for example, with them representing excellent (green) to poor (red). To accomplish this detection, the signal strength of a receiver (Rx) based signal from a transmitter (Tx) may be observed (e.g., at block 905 of FIG. 9). The FSS based tag disrupts the signal from the Tx to the Rx and allows a room of multiple Tx and Rx to show where FSS are throughout a room. In this example representation, only a single wavelength is employed. Multiple wavelengths may be used however.

While exemplary embodiments of the present invention have been disclosed herein, one skilled in the art will recognize that various changes and modifications may be made without departing from the scope of the invention as defined by the following claims.

We claim:

1. A system for unique labeling and identification, comprising
a plurality of identification (ID) tags each comprising an array of frequency selective surfaces (FSS), wherein the FSS comprise conductive traces, the FSS are configured to produce a unique tag response caused by one or more parameters when in the presence of and responsive to a wireless signal, and the one or more parameters include shapes of the conductive traces of the FSS;
one or more receivers configured to receive the unique tag responses of at least some of the plurality of ID tags;
one or more processors configured to identify the plurality of ID tags based on the received unique tag responses; and
a non-transitory computer readable storage medium storing reference values which permit matching individual ones of the plurality of ID tags to the unique tag responses which the plurality of ID tags respectively produce in the presence of the wireless signal,
wherein the one or more processors are further configured to
perform convolutions of the received unique tag responses with masks to calculate coordinate values, and
match the calculated coordinate values with the reference values stored in the non-transitory computer readable storage medium to identify respective ID tags.

* * * * *